United States Patent
Kawato et al.

(10) Patent No.: US 12,055,224 B2
(45) Date of Patent: Aug. 6, 2024

(54) SPOOL VALVE

(71) Applicant: EAGLE INDUSTRY CO., LTD., Tokyo (JP)

(72) Inventors: Tadanobu Kawato, Tokyo (JP); Naoki Nishimura, Tokyo (JP); Masaki Hoshi, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 125 days.

(21) Appl. No.: 17/797,084

(22) PCT Filed: Feb. 17, 2021

(86) PCT No.: PCT/JP2021/005975
§ 371 (c)(1),
(2) Date: Aug. 2, 2022

(87) PCT Pub. No.: WO2021/166969
PCT Pub. Date: Aug. 26, 2021

(65) Prior Publication Data
US 2023/0059732 A1 Feb. 23, 2023

(30) Foreign Application Priority Data
Feb. 19, 2020 (JP) .................................. 2020-026388

(51) Int. Cl.
*F16K 27/04* (2006.01)
*F16K 11/07* (2006.01)
*F15B 13/04* (2006.01)

(52) U.S. Cl.
CPC ............ *F16K 11/07* (2013.01); *F16K 27/041* (2013.01); *F15B 13/0402* (2013.01)

(58) Field of Classification Search
CPC ................................ F16K 27/041; F16K 11/07
(Continued)

(56) References Cited

U.S. PATENT DOCUMENTS

| 4,313,467 A | 2/1982 | Lang .................... F16K 3/24 |
| 6,453,947 B1 | 9/2002 | Inoue et al. .......... F15B 13/044 |

(Continued)

FOREIGN PATENT DOCUMENTS

| CN | 208503125 | 2/2019 | .............. F15B 13/02 |
| DE | 326809 | 10/1920 | .............. F01B 17/04 |

(Continued)

OTHER PUBLICATIONS

Original and Translation of JPS 6034154 U; Red Osamu Sakayoshi, Masayuki Shigeta, Ichiro Nakamura; Mar. 8, 1985.*

(Continued)

*Primary Examiner* — Paul J Gray
(74) *Attorney, Agent, or Firm* — HAYES SOLOWAY P.C.

(57) ABSTRACT

A spool valve including a spool having a plurality of land portions; a sleeve having the spool housed such that the spool is movable in an axial direction and has an input port and an output port and small-diameter portions in the interior of the sleeve. The pressure and flow rate of a fluid passing between the land portions and the small-diameter portions are adjusted by movement of the spool; a plurality of adjustment portions formed as spaces between the small-diameter portions of the sleeve and the land portions of the spool overlapping with each other from a radial direction of the spool; and a guide portion constituted by the small-diameter portion and the land portion which define one of the adjustment portions having a cross-sectional area smaller than each of cross-sectional areas of adjacent two of the adjustment portions having the input port interposed therebetween in the axial direction.

12 Claims, 4 Drawing Sheets

(58) Field of Classification Search
USPC .................................................. 137/625.69
See application file for complete search history.

(56) References Cited

U.S. PATENT DOCUMENTS

| | | | |
|---|---|---|---|
| 11,320,061 B2 | 5/2022 | Nishimura et al. | ............................ F16K 31/0655 |
| 2007/0267078 A1 | 11/2007 | Collet et al. | ............. 137/625.69 |
| 2009/0032753 A1 | 2/2009 | Ishibashi et al. | ........ F16K 31/02 |
| 2012/0018656 A1 | 1/2012 | Holmes et al. | ........... 251/129.15 |
| 2012/0255638 A1 | 10/2012 | Lehner | ................. F16K 11/0716 |
| 2013/0153068 A1 | 6/2013 | West et al. | ............... F16K 11/07 |
| 2014/0352828 A1 | 12/2014 | Landrum | ................ F16K 11/07 |
| 2015/0285105 A1 | 10/2015 | Numakura | ........... F16K 11/0716 |
| 2017/0138489 A1 | 5/2017 | Winkler | ................... F16K 11/07 |
| 2017/0314700 A1 | 11/2017 | Iwanaga et al. | ......... F16K 31/06 |
| 2019/0249788 A1 | 8/2019 | Tanimura et al. | ... F16K 11/0708 |

FOREIGN PATENT DOCUMENTS

| | | | | |
|---|---|---|---|---|
| JP | 54152347 | 10/1979 | ............. | F16K 11/07 |
| JP | 60034154 | 3/1985 | ............. | F16K 11/07 |
| JP | 2001263529 | 9/2001 | ............. | F16K 31/06 |
| JP | 4100161 | 3/2008 | ............. | F16K 31/06 |
| JP | 2009236310 | 10/2009 | ............. | F16K 31/06 |
| JP | 201117381 | 1/2011 | ............. | F16H 61/00 |
| JP | 2012522201 | 9/2012 | ............. | F16K 11/07 |
| JP | 2014238169 | 12/2014 | ............. | F16K 11/07 |
| JP | 2015102150 | 6/2015 | ............. | F16K 51/00 |
| JP | 201813184 | 1/2018 | ............... | F16K 3/24 |
| JP | 2019143781 | 8/2019 | ............. | F16K 31/06 |
| WO | WO2019102909 | 5/2019 | ............. | F16K 31/06 |

OTHER PUBLICATIONS

Official Action issued in related U.S. Appl. No. 17/762,020, dated May 3, 2023, 9 pages.
International Preliminary Report on Patentability issued in PCT/JP2020/035283, dated Mar. 15, 2022, 5 pages.
International Search Report and Written Opinion issued in PCT/JP2020/035283, dated Nov. 2, 2020, with English translation, 12 pages.
International Preliminary Report on Patentability issued in PCT/JP2021/005975, dated Sep. 1, 2022, 12 pages.
International Search Report and Written Opinion issued in PCT/JP2021/005975, dated May 11, 2021, with English translation, 15 pages.
Chinese Official Action issued in Chinese Patent Application 202080066044.8, dated Sep. 29, 2023, 10 pages, with translation.
European Official Action issued in European Patent Application 20868996.8, dated Oct. 2, 2023, 8 pages.
U.S. Appl. No. 17/762,020, filed Mar. 18, 2022.
European Official Action issued in European Patent Application 21757157.9, dated Feb. 23, 2024, 10 pages.

* cited by examiner

SPOOL VALVE

TECHNICAL FIELD

The present invention relates to a spool valve which is used for equipment of an automobile and the like and controls the pressure and flow rate of a control fluid in a fluid circuit.

BACKGROUND ART

A spool valve controls the pressure and flow rate of a control fluid in a fluid circuit with a spool which is moved in an axial direction by the drive of a drive unit for which, for example, air, hydraulic pressure, a motor, a solenoid, or the like is used. A conventional spool valve is known which includes a spool placed in a sleeve and a drive unit disposed on one end side of the spool to generate a driving force in the axial direction with a solenoid, is provided between a pressure source such as a pump or an accumulator and a load, and supplies to the load a control fluid whose pressure and flow rate is adjusted by the movement of the spool (see Patent Citation 1).

Such a spool valve is provided with a spring for biasing the spool toward the drive unit, and the drive unit moves the spool against the urging force of the spring in the axial direction, and the position of the spool relative to the sleeve is set as the target position, so that the flow path communicating the input port and the output port can be adjusted to have the target area for passage.

CITATION LIST

Patent Literature

Patent Citation 1: JP 2001-263529 A (Page 3, FIG. 1)

SUMMARY OF INVENTION

Technical Problem

In the spool valve described in Patent Citation 1, the slidability of the spool may deteriorate at the time of starting the spool valve. This is obvious when a high-pressure fluid is used, and it is thought to be because the fluid accumulated in the narrow gap between the outer peripheral surface of the spool and the inner peripheral surface of the sleeve is likely to change in quality due to a long-term stop state or a temperature drop, or because the high-pressure fluid presses the spool biased in a circumferential direction against the inner surface of the sleeve.

The present invention has been made in view of such a problem, and an object of the present invention is to provide a spool valve capable of operating a spool smoothly.

Solution to Problem

In order to solve the problem described above, a spool valve according to the present invention a spool valve including: a spool having a plurality of land portions; a sleeve that has the spool housed therein in such a manner that the spool is movable in an axial direction and that has an input port and an output port and further has small-diameter portions in the interior of the sleeve, pressure and flow rate of a fluid passing between the land portions and the small-diameter portions being adjusted by movement of the spool; a plurality of adjustment portions formed as spaces between the small-diameter portions of the sleeve and the land portions of the spool overlapping with each other in a view from a radial direction of the spool; and a guide portion constituted by the small-diameter portion and the land portion which define one of the adjustment portions having a cross-sectional area smaller than each of cross-sectional areas of adjacent two of the adjustment portions having the input port interposed therebetween in the axial direction. According to the aforesaid feature of the present invention, the fluid can be released through the adjacent adjustment portions on opposite sides of the input port in the axial direction at startup, and the spool can be guided in the axial direction by the guide portion, so that the spool can be operated smoothly.

It may be preferable that the adjustment portion constituted by the guide portion is provided axially adjacent to one of the two of the adjustment portions having the input port interposed therebetween in the axial direction. According to this preferable configuration, the distance in the axial direction between the input port into which the fluid flows and the guide portion is short, so that the tilt of the spool can be prevented to operate the spool smoothly.

It may be preferable that the adjustment portion constituted by the guide portion has a smallest cross-sectional area among the adjustment portions. According to this preferable configuration, the tilt of the spool can be prevented to operate the spool smoothly.

It may be preferable that the land portion constituting the guide portion is one of the land portions disposed closest to a spring for biasing the spool. According to this preferable configuration, the tilt of the spool can be further prevented to operate the spool smoothly.

It may be preferable that the adjustment portions each constituting the guide portion are adjacent two of the adjustment portions having the input port and the output port interposed therebetween in the axial direction. According to this preferable configuration, the spool is supported by the guide portions at two locations separated from each other in the axial direction, so that the tilt of the spool can be prevented to operate the spool smoothly.

It may be preferable that the land portion partially forming the guide portion has a longest size in the axial direction among the land portions. According to this preferable configuration, the contact area between the land portion and the small-diameter portion which constitute the guide portion can be increased, so that the pressing force of the land portion against the small-diameter portion can be dispersed to operate the spool smoothly.

DESCRIPTION OF EMBODIMENTS

Modes for carrying out a spool valve according to the present invention will be described below based on embodiments.

First Embodiment

A spool valve according to a first embodiment of the present invention will be described with reference to FIGS. 1 to 3. Hereinafter, the left and right sides when viewed from the front side of FIG. 1 will be described as the left and right sides of the spool valve.

A spool valve 1 is used for hydraulically controlled equipment such as an automatic transmission of a vehicle, and controls the pressure and flow rate of a control fluid such as hydraulic oil in a fluid circuit.

Figure 1:
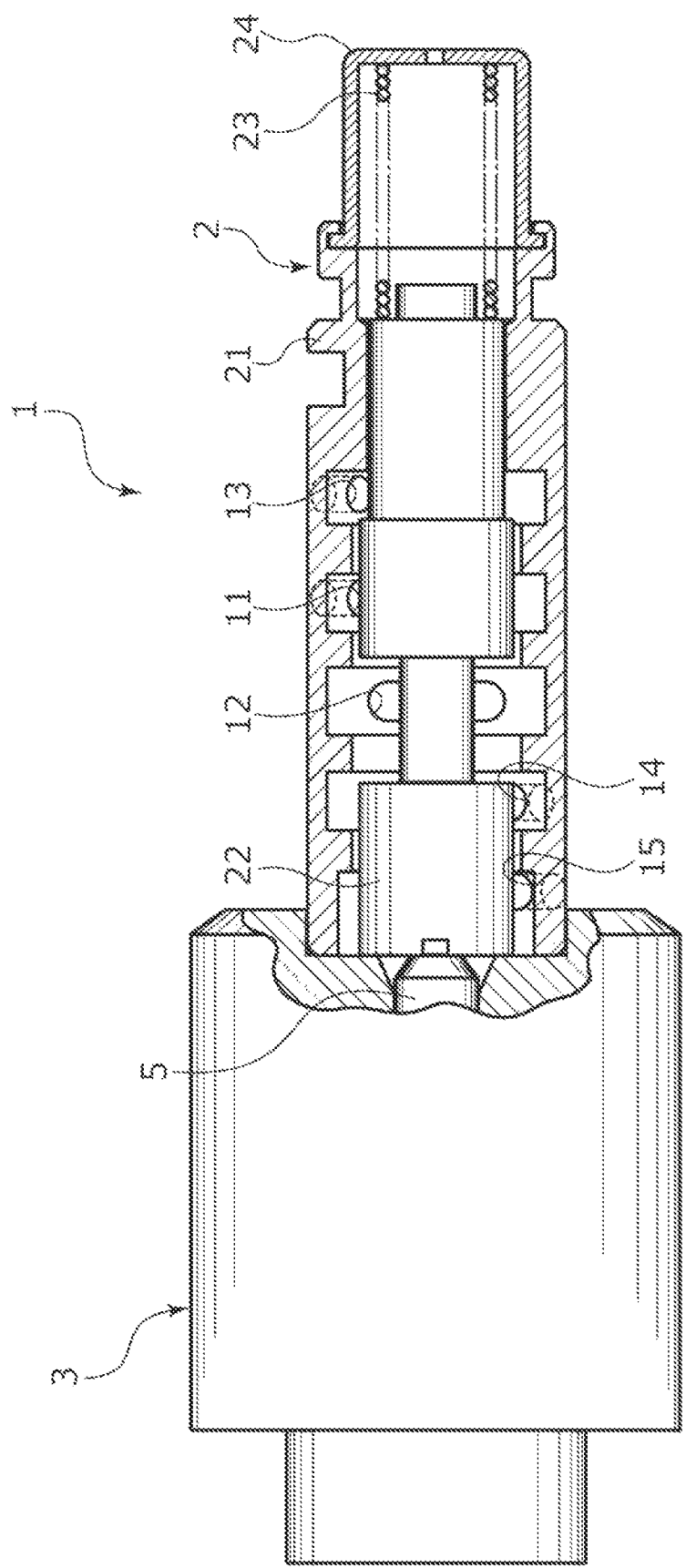
FIG. 1 is a partial cross-sectional view showing a spool valve according to a first embodiment of the present invention.

As shown in FIG. 1, the spool valve 1 is configured such that a valve portion 2 for adjusting the flow rate of a fluid as a valve is integrally attached to a drive unit 3 with a solenoid. The drive unit 3 according to the embodiment has a general solenoid configuration, and detailed description thereof will be omitted.

Figure 2:
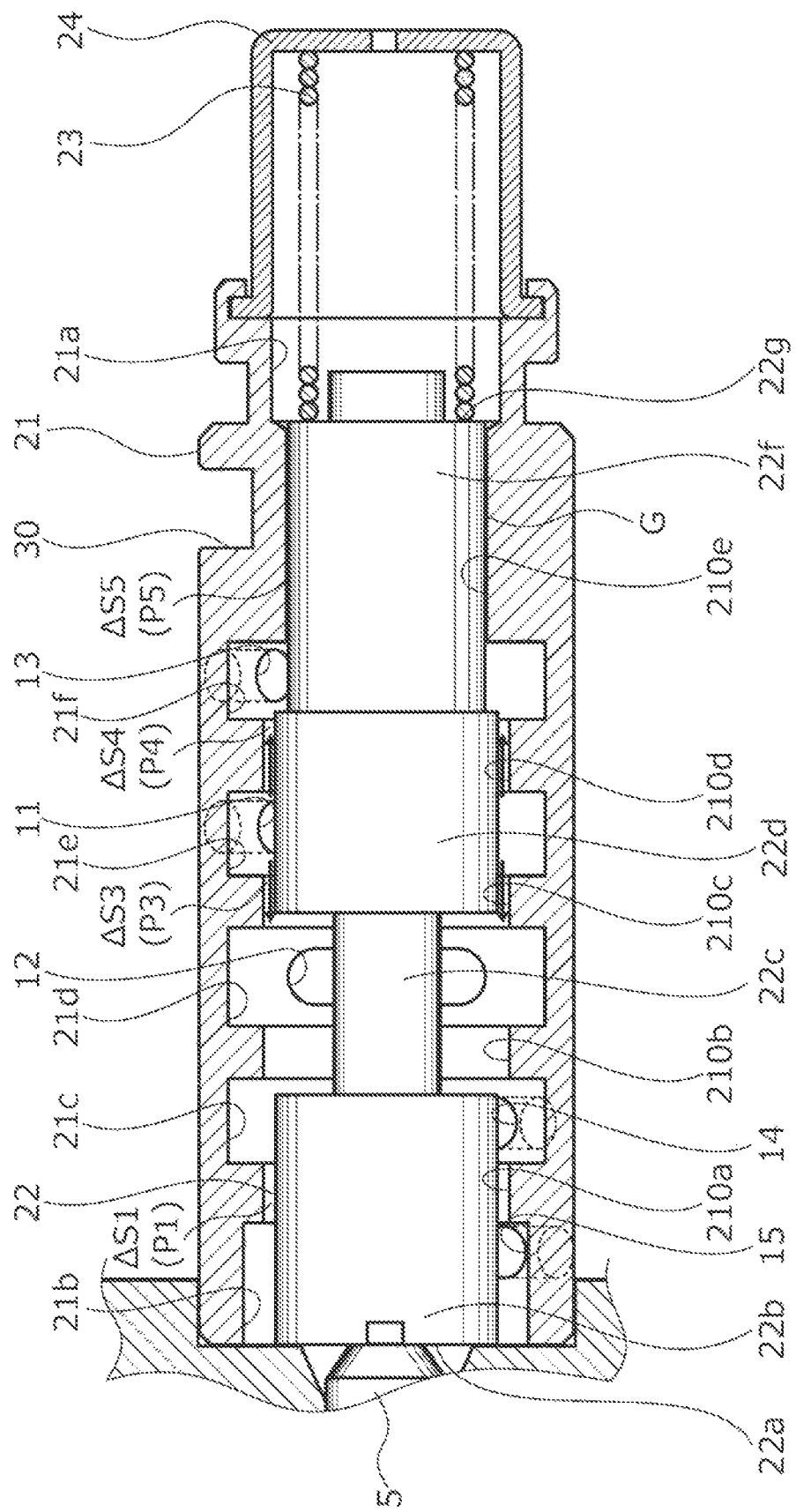
FIG. 2 is an enlarged cross-sectional view showing a valve portion during an off-state of the spool valve according to the first embodiment of the present invention.

As shown in FIGS. 1 and 2, the spool valve 1 according to the embodiment is a normally closed type spool valve in which the flow path between an input port 11 and an output port 12 is blocked during an off-state in which the coil of a solenoid (not shown) is not energized.

As shown in FIG. 1, the valve portion 2 mainly includes a cylindrical sleeve 21, a spool 22 which is liquid-tightly placed inside the sleeve 21 and is movable in an axial direction, a coil-shaped spring 23 which is attached to the right end of the spool 22 in the axial direction and biases the spool 22 to the left in the axial direction, and a retainer 24 caulked and fixed to the right end of the sleeve 21 in the axial direction to retain the spring 23. The sleeve 21, the spool 22, and the retainer 24 are made of materials such as aluminum, iron, stainless steel, and resin.

Figure 3:
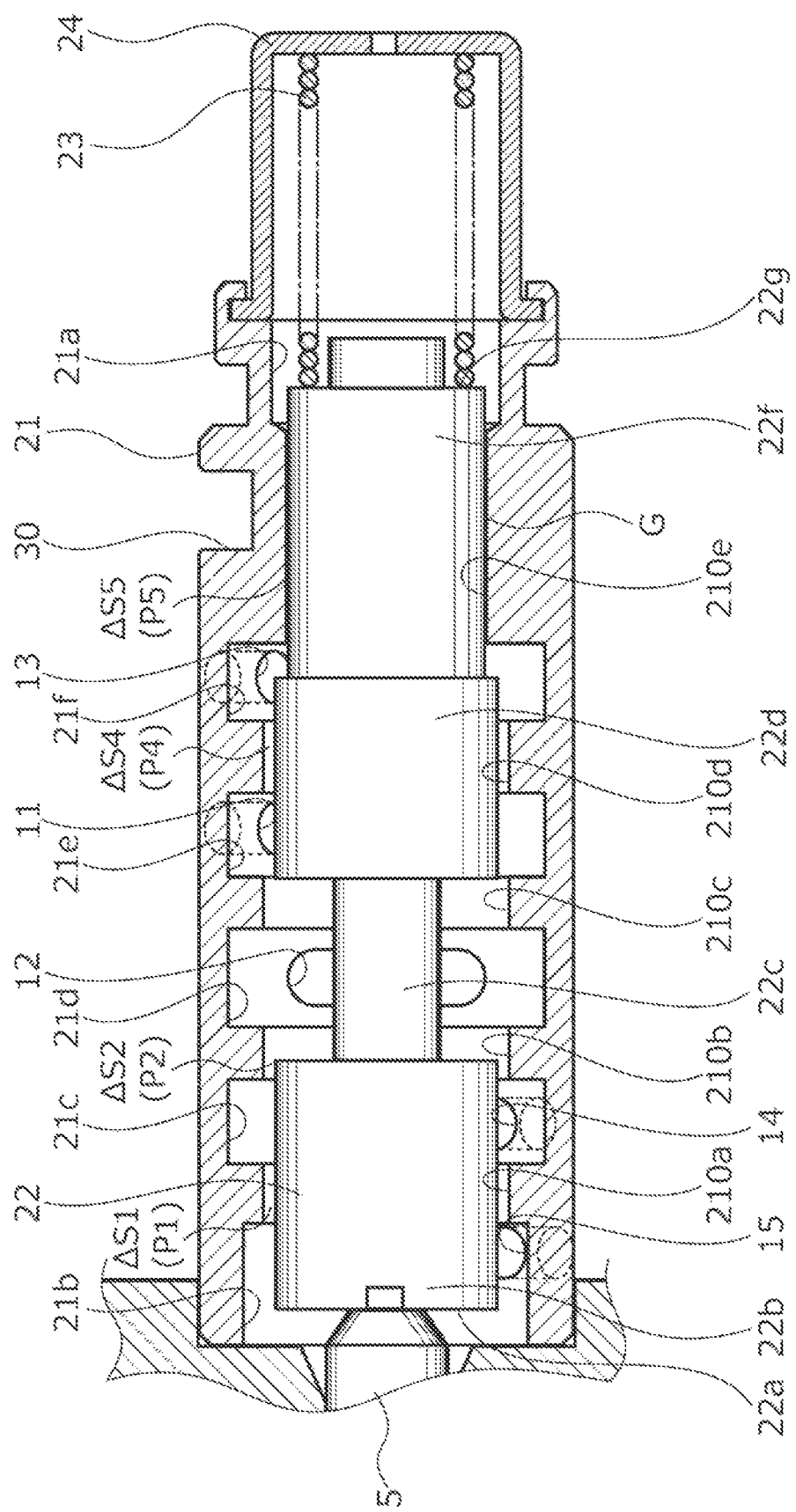
FIG. 3 is an enlarged cross-sectional view showing the valve portion during an on-state of the spool valve according to the first embodiment of the present invention.

As shown in FIGS. 1 to 3, the sleeve 21 is formed in a cylindrical shape with opposite ends in the axial direction open, and is provided with the input port 11, the output port 12, a feedback port 13, a discharge port 14, and a breathing port 15 which extend through the sleeve 21 in a radial direction.

As shown in FIGS. 2 and 3, the sleeve 21 is provided with a through hole 21a in which the spool 22 is placed so as to be movable in the axial direction. The inner peripheral surface of the sleeve 21, that is, the inner peripheral surface of the through hole 21a is formed into a circle in cross section.

The through hole 21a is provided, on the inner peripheral surface, with a first annular recess 21b to which the breathing port 15 is open, a second annular recess 21c to which the discharge port 14 is open, and a third annular recess 21d to which the output port 12 is open, a fourth annular recess 21e to which the input port 11 is open, and a fifth annular recess 21f to which the feedback port 13 is open in order from the left side in the axial direction to the right side in the axial direction. The feedback port 13 is in communication with the output port 12 via a throttle (not shown) in the outer peripheral portion of the sleeve 21.

Further, the through hole 21a is provided, on the inner peripheral surface, with a first small-diameter portion 210a formed between the first annular recess 21b and the second annular recess 21c, a second small-diameter portion 210b formed between the second annular recess 21c and the third annular recess 21d, a third small-diameter portion 210c formed between the third annular recess 21d and the fourth annular recess 21e, a fourth small-diameter portion 210d formed between the fourth annular recess 21e and the fifth annular recess 21f, and a fifth small-diameter portion 210e formed on the right side of the fifth annular recess 21f in the axial direction. The small-diameter portions are disposed corresponding to land portions of the spool 22 described later.

In the embodiment, adjustment portions P (P1, P2, P3, P4, P5) mean spaces between the small-diameter portions of the sleeve and the land portions of the spool in parts in which they overlap in the radial direction (hereinafter, the "land portions which overlap the small-diameter portions in the radial direction" are also referred to as the "land portions corresponding to the small-diameter portions"), and the inner and outer peripheries of the adjustment portions P are defined by the land portions of the spool and the small-diameter portions of the sleeve. Area differences $\Delta S$ (i.e., $\Delta S1$, $\Delta S2$, $\Delta S3$, $\Delta S4$, $\Delta S5$) between the inner diameter cross-sectional areas in the small-diameter portions of the sleeve which define the adjustment portions P and the outer diameter cross-sectional areas of the land portions which overlap the small-diameter portions in the radial direction, that is, the cross-sectional areas of the adjustment portions P will be referred to below.

For example, in the embodiment, the small-diameter portions defining the adjustment portions P3 and P4 on opposite sides of the input port 11 in the axial direction are the third small-diameter portion 210c and the fourth small-diameter portion 210d.

Further, in the embodiment, the small-diameter portion defining the adjustment portion P5 is the fifth small-diameter portion 210e, which constitutes the guide portion G. The guide portion G is constituted by the small-diameter portion and the land portion which define the adjustment portion having the smallest area difference $\Delta S$ among the adjustment portions P. In other words, the guide portion G defines the adjustment portion having the smallest area difference $\Delta S$.

Further, in the embodiment, the inner diameters of the first small-diameter portion 210a, the second small-diameter portion 210b, the third small-diameter portion 210c, and the fourth small-diameter portion 210d are configured to have substantially the same diameter, and the inner diameter of the fifth small-diameter portion 210e is configured to be smaller than the inner diameters of the small-diameter portions described above.

As shown in FIGS. 2 and 3, the spool 22 is formed into a columnar shape having a circular cross section, and mainly includes a first land portion 22b having a left end surface 22a of the spool 22 in the axial direction, a first small-diameter portion 22c formed having a smaller diameter than the first land portion 22b, a second land portion 22d formed having a larger diameter than the first small-diameter portion 22c, and a third land portion 22f formed having a smaller diameter than the second land portion 22d in order from the left side in the axial direction to the right side in the axial direction.

In the embodiment, the land portion defining the adjustment portions P3 and P4 on opposite sides of the input port 11 in the axial direction is the second land portion 22d.

Further, in the embodiment, the land portion defining the adjustment portion P5 in the guide portion G is the third land portion 22f. That is, the guide portion G is constituted by the fifth small-diameter portion 210e of the sleeve 21 and the third land portion 22f of the spool 22.

In the first embodiment, the outer diameter of the first land portion 22b and the outer diameter of the second land portion 22d are configured to be substantially the same diameter, and the outer diameter of the third land portion 22f is configured to be smaller than the outer diameters of the first land portion 22b and the second land portion 22d.

The left end surface 22a of the spool 22 in the axial direction is in contact with the right end surface of the rod 5 in the axial direction which constitutes the drive unit 3. As shown in FIG. 3, during an on-state of the spool valve 1, the spool 22 is movable in the axial direction together with the rod 5.

An annular surface portion 22g formed on the right end surface of the third land portion 22f of the spool 22 in the axial direction is in contact with one end of the coil-shaped spring 23 for biasing the spool 22 to the left in the axial direction. The spring 23 is compressed and retained between the annular surface portion 22g of the third land portion 22f and the retainer 24 caulked and fixed to the right end portion of the sleeve 21 in the axial direction.

Slight gaps are provided in the radial direction between the inner peripheral surfaces of the first small-diameter portion 210a, the second small-diameter portion 210b, the third small-diameter portion 210c, the fourth small-diameter portion 210d, and the fifth small-diameter portion 210e of the sleeve 21, and the outer peripheral surfaces of the first land portion 22b, the second land portion 22d, and the third land portion 22f of the spool 22, so that the spool 22 is smoothly movable in the axial direction.

Specifically, during the off-state of the spool valve 1 shown in FIG. 2, the area difference $\Delta S3$ $(=ID_3-OD_2)$ between an inner diameter cross-sectional area $ID_3$ in the third small-diameter portion 210c defining the adjustment portion P3 on the left side of the input port 11 in the axial direction, and an outer diameter cross-sectional area $OD_2$ of the second land portion 22d corresponding to the third small-diameter portion 210c, and the area difference $\Delta S4$ $(=ID_4-OD_2)$ between an inner diameter cross-sectional area $ID_4$ in the fourth small-diameter portion 210d defining the adjustment portion P4 on the right side of the input port 11 in the axial direction, and an outer diameter cross-sectional area $OD_2$ of the second land portion 22d corresponding to the fourth small-diameter portion 210d are configured to be substantially the same ($\Delta S3=\Delta S4$).

Further, the area difference $\Delta S5$ $(=ID_5-OD_3)$ between an inner diameter cross-sectional area $ID_5$ in the fifth small-diameter portion 210e defining the adjustment portion P5 in the guide portion G and an outer diameter cross-sectional area $OD_3$ of the third land portion 22f corresponding to the fifth small-diameter portion 210e is configured to be smaller than the area differences $\Delta S3$ and $\Delta S4$ described above in the adjustment portions P3 and P4 on opposite sides of the input port 11 in the axial direction ($\Delta S3=\Delta S4>\Delta S5$).

During the off-state of the spool valve 1, the area difference $\Delta S1(=ID_1-OD_1)$ between an inner diameter cross-sectional area $ID_1$ in the first small-diameter portion 210a defining the adjustment portion P1 and an outer diameter cross-sectional area $OD_1$ of the first land portion 22b corresponding to the first small-diameter portion 210a is configured to be substantially the same as the area differences $\Delta S3$ and $\Delta S4$ in the adjustment portions P3 and P4 on opposite sides of the input port 11 in the axial direction ($\Delta S1=\Delta S3=\Delta S4$).

That is, during the off-state of the spool valve 1 according to the first embodiment, the adjustment portion P5 in the guide portion G is configured to have the smallest area difference $\Delta S5$.

During the on-state of the spool valve 1 shown in FIG. 3, the area difference $\Delta S2$ $(=ID_2-OD_1)$ between an inner diameter cross-sectional area $ID_2$ in the second small-diameter portion 210b defining the adjustment portion P2 and the outer diameter cross-sectional area $OD_1$ of the first land portion 22b corresponding to the second small-diameter portion 210b is configured to be substantially the same as the area difference $\Delta S1$ of the adjustment portion P1 (i.e., $\Delta S1=\Delta S2$).

That is, the adjustment portion P5 in the guide portion G is configured to have the smallest area difference $\Delta S5$ among all the adjustment portions P in the spool valve 1 according to the first embodiment.

Accordingly, the spool 22 is guided in the axial direction with the outer peripheral surface of the third land portion 22f supported by the inner peripheral surface of the fifth small-diameter portion 210e of the sleeve 21, so that the spool 22 is smoothly movable.

Further, the area differences $\Delta S3$ and $\Delta S4$ in the adjustment portions P3 and P4 on opposite sides of the input port 11 in the axial direction are configured to be larger than the area difference $\Delta S5$ in the adjustment portion P5 in the guide portion G. Accordingly, even when the flow path between the input port 11 and the output port 12 is blocked by the second land portion 22d during the off-state of the spool valve 1, a part of the fluid in the fourth annular recess 21e to which the input port 11 is open can flow through the gaps on opposite sides of the input port 11 in the axial direction to the third annular recess 21d and the fifth annular recess 21f which are adjacent to the fourth annular recess 21e in the axial direction (see the black arrows in FIG. 2).

During the off-state and the operating state of the spool valve 1, the amount of fluid flowing from the fourth annular recess 21e to the third annular recess 21d and the fifth annular recess 21f is set so as not to affect the control of the pressure and flow rate of the control fluid in the fluid circuit.

Accordingly, at the time of starting the spool valve 1, the fluid in the fourth annular recess 21e can be released through the adjustment portions P3 and P4 on opposite sides of the input port 11 in the axial direction, that is, the gaps between the inner peripheral surfaces of the third small-diameter portion 210c and the fourth small-diameter portion 210d of the sleeve 21 and the outer peripheral surface of the second land portion 22d of the spool 22 corresponding to the third small-diameter portion 210c and the fourth small-diameter portion 210d, and the outer peripheral surface of the third land portion 22f of the spool 22 which defines the adjustment portion P5 in the guide portion G can be supported by the inner peripheral surface of the fifth small-diameter portion 210e of the sleeve 21 to guide the spool 22 in the axial direction, so that the spool 22 can be operated smoothly.

Further, the spool valve 1 is of a normally closed type and has such a structure that it is easily affected by the fluid accumulated in the gaps on opposite sides of the input port 11 in the axial direction at the time of stating the spool valve 1. However, as described above, since the fluid can be released from the inside of the fourth annular recess 21e to the third annular recess 21d and the fifth annular recess 21f at startup, the responsiveness of the spool valve 1 is effectively enhanced.

Further, even when a high-pressure fluid flows from the input port 11 into the fourth annular recess 21e in the sleeve 21 at the time of starting the spool valve 1, a part of the high-pressure fluid is released from the inside of the fourth annular recess 21e to the third annular recess 21d and the fifth annular recess 21f through the gaps in the adjustment portions P3 and P4 on opposite sides of the input port 11 in the axial direction to prevent an excessive increase in pressure in the fourth small-diameter portion 210d and to weaken the pressing force against the outer peripheral surface of the third land portion 22f which is supported by the inner peripheral surface of the fifth small-diameter portion 210e defining the adjustment portion P5 in the guide portion G, facilitating the smooth operation of the spool 22.

Further, both the outer peripheral surface of the spool 22 and the inner peripheral surface of the sleeve 21 have a circular cross section. Accordingly, a gap between the outer peripheral surface of the spool 22 and the inner peripheral surface of the sleeve 21 is formed in a well-balanced manner in the circumferential direction, so that the spool 22 is less likely to be affected by the fluid in the sleeve 21 and the operation of the spool 22 can be stabilized.

Further, the adjustment portion P5 in the guide portion G is provided axially adjacent to the adjustment portion P4 on the right side of the input port 11 in the axial direction. Accordingly, the axial distance between the fourth annular recess 21e to which the input port 11 is open, into which the high-pressure fluid flows, and the fifth small-diameter portion 210e defining the adjustment portion P5 in the guide portion G can be shortened, so that the tilt of the spool 22 can be prevented to operate the spool 22 smoothly.

Further, in the spool valve 1, the adjustment portion P5 in the guide portion G has the smallest area difference ΔS5. Accordingly, the adjustment portion P5 in the guide portion G has the smallest gap, and the outer peripheral surface of the third land portion 22f is immediately brought into contact with the inner peripheral surface of the fifth small-diameter portion 210e by the tilt of the spool 22, so that the tilt of the spool 22 can be prevented to operate the spool 22 smoothly.

Further, the third land portion 22f defining the adjustment portion P5 in the guide portion G has the annular surface portion 22g formed on the right end surface in the axial direction thereof, which is in contact with one end of the spring 23 for biasing the spool 22. That is, the third land portion 22f is disposed closest to the spring 23 among the land portions of the spool 22. Accordingly, in the adjustment portion P5 in the guide portion G, the outer peripheral surface of the third land portion 22f, which is highly aligned by the spring 23, is guided by the inner peripheral surface of the fifth small-diameter portion 210e, so that the tilt of the spool 22 can be further prevented to operate the spool 22 smoothly.

Further, the third land portion 22f defining the adjustment portion P5 in the guide portion G is configured to have the longest size in the axial direction among the land portions of the spool 22. Accordingly, the contact area between the outer peripheral surface of the third land portion 22f and the inner peripheral surface of the fifth small-diameter portion 210e which define the adjustment portion P5 in the guide portion G can be increased, so that the pressing force of the third land portion 22f against the fifth small-diameter portion 210e due to the high-pressure fluid flowing from the input port 11 can be dispersed to operate the spool 22 smoothly.

A groove 30 into which a retaining pin (not shown) is inserted when the spool valve 1 is installed in the equipment is provided in an outer peripheral portion of the sleeve 21 corresponding to a part of the fifth small-diameter portion 210e which defines the adjustment portion P5 in the guide portion G and is configured to have the longest size in the axial direction. Accordingly, the size of the valve portion 2 in the axial direction can be configured to be compact.

Further, the inner diameters of the first small-diameter portion 210a, the second small-diameter portion 210b, the third small-diameter portion 210c, and the fourth small-diameter portion 210d on the inner peripheral surface of the sleeve 21 are configured to be substantially the same diameter, and the outer diameters of the first land portion 22b, the second land portion 22d, and the third land portion 22f of the spool 22 can be changed, facilitating the processing of the sleeve 21 and the spool 22 at the time of manufacturing the spool valve 1.

Second Embodiment

Next, a spool valve according to a second embodiment of the present invention will be described with reference to FIG. 4. The description of the same configuration as the first embodiment described above and the overlapping configuration will be omitted.

Figure 4:
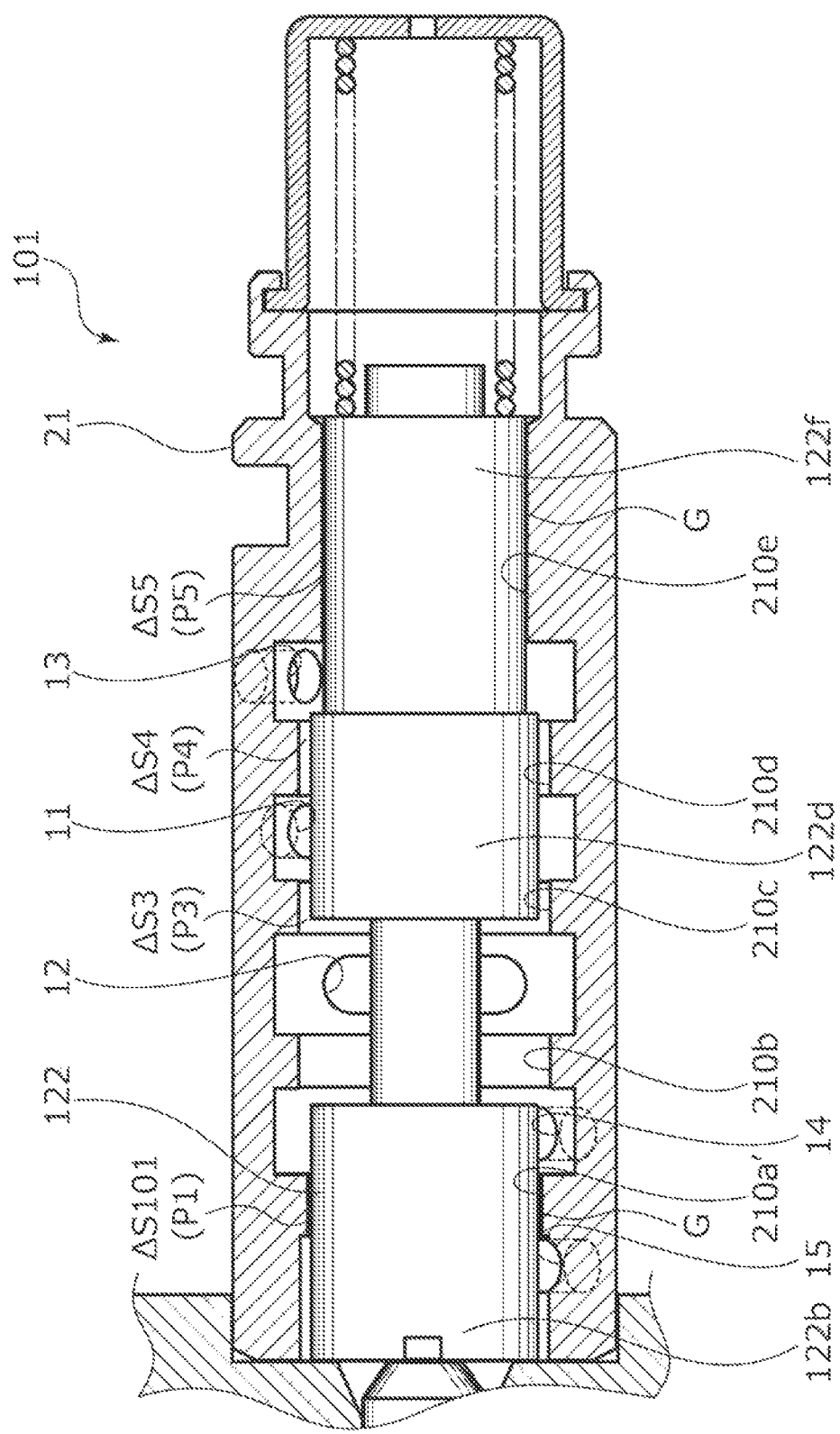
FIG. 4 is an enlarged cross-sectional view showing a valve portion during an off-state of a spool valve according to a second embodiment of the present invention.

As shown in FIG. 4, in a spool valve 101 according to the second embodiment, the outer diameters of a first land portion 122b and a second land portion 122d of a spool 122 are configured to be substantially the same, and the outer diameter of a third land portion 122f are configured to be smaller than the outer diameters of the first land portion 122b and the second land portion 122d.

Further, the inner diameter of a first small-diameter portion 210a' is configured to be smaller than the inner diameters of the second small-diameter portion 210b, the third small-diameter portion 210c, and the fourth small-diameter portion 210d, and to be larger than the inner diameter of the fifth small-diameter portion 210e.

Specifically, during the off-state of the spool valve 101 shown in FIG. 4, the area difference $\Delta S101$ ($=ID_{101}-OD_1$) between an inner diameter cross-sectional area $ID_{101}$ in the first small-diameter portion 210a' defining the adjustment portion P1 and an outer diameter cross-sectional area $OD_1$ of the first land portion 122b corresponding to the first small-diameter portion 210a', and the area difference $\Delta S5$ ($=ID_5-OD_3$) between the inner diameter cross-sectional area $ID_5$ in the fifth small-diameter portion 210e defining the adjustment portion P5 in the guide portion G and the outer diameter cross-sectional area $OD_3$ of the third land portion 122f corresponding to the fifth small-diameter portion 210e are configured to be substantially the same ($\Delta S101=\Delta S5$).

That is, in the spool valve 101 according to the second embodiment, the adjustment portions P1 and P5 having the smallest area difference ΔS are provided in the adjustment portions on opposite sides of the input port 11 and the output port 12 in the axial direction with the input port 11 and the output port 12 interposed therebetween.

Accordingly, a spool 122 is supported by the adjustment portions P1 and P5 at two guide portions G separated from each other in the axial direction, so that the tilt of the spool 122 can be prevented to operate the spool 122 smoothly.

The area difference ΔS101 in the adjustment portion P1 is not limited to the one configured to be substantially the same as the area difference ΔS5 in the adjustment portion P5 in the guide portion G on the right side in the axial direction, and as long as it is the one configured to be smaller than the area differences ΔS3 and ΔS4 in the adjustment portions P3 and P4 on opposite sides of the input port 11 in the axial direction, it may be configured to be slightly larger than the area difference ΔS5 in the adjustment portion P5 in the guide portion G.

Although embodiments of the present invention have been described above with reference to the drawings, the specific configuration is not limited to these embodiments, and any changes or additions without departing from the scope of the present invention are included in the present invention.

For example, in the embodiments described above, the solenoid has been described as being used as the drive unit of the spool valve, but the present invention is not limited to this, and air, hydraulic pressure, a motor or the like may be selected as the drive unit of the spool valve.

Further, in the embodiments described above, the through hole of the sleeve has been described as being provided, on the inner peripheral surface, with the first annular recess to which the breathing port is open, the second annular recess to which the discharge port is open, the third annular recess to which the output port is open, the fourth annular recess to which the input port is open, and the fifth annular recess to which the feedback port is open in order from the left side in the axial direction to the right side in the axial direction, but the present invention is not limited to this, and the correspondence relationship between the ports and the annular recesses may be appropriately changed depending on the configuration of the fluid circuit of the equipment and the like. For example, when the spool valve is of a normally closed type as in the embodiments described above, the breathing port, the feedback port, the input port, the output port, and the discharge port may be formed corresponding to respective annular recesses in order from the left side in the axial direction to the right side in the axial direction.

Further, when the spool valve is of a normally open type, the breathing port, the feedback port, the discharge port, the output port, and the input port, or the breathing port, the input port, the output port, the discharge port, and the feedback port may be formed corresponding to the respective annular recesses in order from the left side in the axial direction to the right side in the axial direction.

Further, in the embodiments described above, the mode in which the fluid in the fourth annular recess is released through the gaps in the adjustment portions on opposite sides of the input port in the axial direction to the third annular recess and the fifth annular recess at the time of starting the spool valve has been described, but the present invention is limited to this, and one in which the fluid in the fourth annular recess can be released through at least one of the gaps in the adjustment portions on opposite sides of the input port in the axial direction may be applicable.

Further, in the embodiments described above, the mode in which the area differences in the adjustment portions on opposite sides of the input port in the axial direction is configured to have substantially the same size has been described, but the area differences in the adjustment portions on opposite sides of the input port in the axial direction may be different from each other as long as they are larger than the area difference in the adjustment portion in the guide portion. For example, when the area difference in the adjustment portion on the right side of the input port in the axial direction is configured to be larger than the area difference in the adjustment portion on the left side of the input port in the axial direction, the larger amount of the fluid in the fourth annular recess can be released toward the fifth annular recess to which the feedback port is open to prevent the leakage of the control fluid into the third annular recess to which the output port is open.

Further, on the other hand, when the area difference in the adjustment portion on the left side of the input port in the axial direction is configured to be larger than the area difference in the adjustment portion on the right side of the input port in the axial direction, the larger amount of the fluid in the fourth annular recess can be released to the third annular recess to which the output port is open to facilitate the discharge of the altered fluid in the sleeve to the outside through the output port and the discharge port at startup.

Further, the outer peripheral surface of the spool and the inner peripheral surface of the sleeve are not limited to those having a circular cross section, and may have, for example, an elliptical cross section, a polygonal cross section, or the like.

Further, the adjustment portion in the guide portion having the smallest area difference may not be axially adjacent to the adjustment portions on opposite sides of the input port in the axial direction.

Further, the land portion which defines the adjustment portion in the guide portion having the smallest area difference is not limited to the one configured to have the longest size in the axial direction, and may have substantially the same size in the axial direction as the other land portions and may be configured to have the shortest size in the axial direction.

Further, in the embodiments described above, the three land portions have described as being formed in the sleeve, but the number of land portions may be two or more.

Further, the inner diameters of the small-diameter portions may be configured to have the different diameter, or two or more of the small-diameter portions may be configured to have the same diameter.

REFERENCE SIGNS LIST 1 spool valve
2 valve portion
3 drive unit
11 input port
12 output port
13 feedback port
14 discharge port
15 breathing port
21 sleeve
21a through hole
21b first annular recess
21c second annular recess
21d third annular recess
21e fourth annular recess
21f fifth annular recess
22 spool
22b first land portion
22c first small-diameter portion
22d second land portion
22f third land portion (land portion constituting guide portion)
23 spring
101 spool valve
122 spool
122b first land portion
122d second land portion
122f third land portion (land portion constituting guide portion)
210a first small-diameter portion
210a' first small-diameter portion (small-diameter portion constituting guide portion)
210b second small-diameter portion
210c third small-diameter portion
210d fourth small-diameter portion
210e fifth small-diameter portion (small-diameter portion constituting guide portion)
G guide portion
P adjustment portion
ΔS area difference

The invention claimed is:

1. A spool valve comprising:
a spool having a plurality of land portions;
a sleeve that has the spool housed therein in such a manner that the spool is movable in an axial direction and that has an input port and an output port and further has small-diameter portions in an interior of the sleeve, wherein pressure and flow rate of a fluid passing between the land portions and the small-diameter portions is adjustable by movement of the spool;
a plurality of adjustment portions formed as spaces between the small-diameter portions of the sleeve and the land portions of the spool overlapping with each other in a view from a radial direction of the spool; and
a guide portion constituted by one of the small-diameter portions of the sleeve and one of the land portions of the spool which define one of the adjustment portions having a cross-sectional area smaller than each of cross-sectional areas of adjacent two of the adjustment portions having the input port interposed therebetween in the axial direction, wherein
the land portion constituting the guide portion is one of the land portions disposed closest to a spring for biasing the spool, and
the land portion partially forming the guide portion has a longest size in the axial direction among the land portions.

2. The spool valve according to claim 1, wherein
the adjustment portion constituted by the guide portion is provided axially adjacent to one of the two of the adjustment portions having the input port interposed therebetween in the axial direction.

3. The spool valve according to claim 1, wherein
the adjustment portion constituted by the guide portion has a smallest cross-sectional area among the adjustment portions.

4. The spool valve according to claim 1, wherein
the adjustment portions each constituting the guide portion are adjacent two of the adjustment portions having the input port and the output port interposed therebetween in the axial direction.

5. The spool valve according to claim 2, wherein
the adjustment portion constituted by the guide portion has a smallest cross-sectional area among the adjustment portions.

6. The spool valve according to claim 2, wherein
the land portion constituting the guide portion is one of the land portions disposed closest to a spring for biasing the spool.

7. The spool valve according to claim 2, wherein
the adjustment portions each constituting the guide portion are adjacent two of the adjustment portions having the input port and the output port interposed therebetween in the axial direction.

8. The spool valve according to claim 2, wherein
the land portion partially forming the guide portion has a longest size in the axial direction among the land portions.

9. The spool valve according to claim 3, wherein
the land portion constituting the guide portion is one of the land portions disposed closest to a spring for biasing the spool.

10. The spool valve according to claim 3, wherein
the adjustment portions each constituting the guide portion are adjacent two of the adjustment portions having the input port and the output port interposed therebetween in the axial direction.

11. The spool valve according to claim 3, wherein
the land portion partially forming the guide portion has a longest size in the axial direction among the land portions.

12. The spool valve according to claim 4, wherein
the land portion partially forming the guide portion has a longest size in the axial direction among the land portions.

* * * * *